United States Patent [19]

Golden et al.

[11] Patent Number: 4,572,575
[45] Date of Patent: Feb. 25, 1986

[54] BICYCLE TYPE SEAT

[76] Inventors: Robert C. Golden, 31996 Riverdale, Mt. Clemens, Mich. 48045; Martin J. Neumeyer, 517 Hampshire, Utica, Mich. 48087

[21] Appl. No.: 423,582

[22] Filed: Sep. 27, 1982

[51] Int. Cl.[4] .............................................. B62J 1/00
[52] U.S. Cl. .................................... 297/195; 297/214
[58] Field of Search ................................ 297/195, 214

[56] References Cited

U.S. PATENT DOCUMENTS

| 557,238 | 3/1896 | Seaman | 297/195 |
|---|---|---|---|
| 581,464 | 4/1897 | Hollenbeck | 297/214 |
| 2,631,654 | 3/1953 | Douglas et al. | 297/195 |
| 3,497,258 | 2/1970 | Hill | 297/195 X |

FOREIGN PATENT DOCUMENTS

| 68925 | 6/1947 | Denmark | 297/195 |
|---|---|---|---|
| 833296 | 1/1952 | Fed. Rep. of Germany | 297/195 |
| 327562 | 6/1903 | France | 297/195 |

*Primary Examiner*—William E. Lyddane
*Assistant Examiner*—Peter A. Aschenbrenner
*Attorney, Agent, or Firm*—Neal A. Waldrop; Jay C. Taylor

[57] ABSTRACT

A seat adapted for use on a bicycle has a major rump supporting portion and a central sagittal portion adapted to underlie the perineum of the occupant. A cantilevered portion extends forwardly from the sagittal portion and has sides parallel to and spaced by the sagittal plane to facilitate orientation by the occupant of his position on the seat and to provide leverage for the thighs to facilitate readjustment of his position and balancing of himself and the vehicle. The major rump supporting portion terminates forwardly along a pair of complex curves extending laterally from the sagittal portion to the opposite forward edges of the major rump supporting portion, each curve conforming to the overlying physiological curve of the occupant between the buttock and the posterior portion of the thigh to provide uninterrupted support for the major forward portion of the buttock.

19 Claims, 5 Drawing Figures

BICYCLE TYPE SEAT

The present invention relates to improvements in a seat structure particularly adapted for use with recreational vehicles, such as bicycles, tricycles, mopeds, motorcycles, and the like and various types of amusement park conveyances for example which provides comfortable seating for the occupant, enables free use of his legs, as for example when pedaling, facilitates continuous sensing by the occupant of his position on the seat during pedaling or when jostled during operation of the vehicle, as for example in consequence of rough terrain or intricate maneuvering, and provides leverage to enable the occupant to reestablish himself comfortably on the seat in the event he is temporarily jostled out of position or balance.

BACKGROUND AND OBJECTS OF THE INVENTION

The seating art is replete with seats that conform comfortably to the passive occupant, and a host of bicycle type seats have been provided to accommodate various modes of cycling or to improve balance and seating orientation on vehicles subject to rapid changes in speed or direction. However such seats known heretofore have not been properly designed to provide optimum anatomical support and comfort for the occupant, nor to provide adequate structure to enable continuous sensing by the occupant of his position on the seat, nor leverage for realigning and balancing himself and the vehicle during operation.

An object of the present invention is to provide an improved seat of the above type capable of providing optimum support and comfort for the occupant, even when seated for an extended interval of time, and which provides the above noted improvements and avoids the above noted shortcomings of conventional seats.

Another object is to provide such a seat that is especially suitable for use with a bicycle or pedal type vehicle that conforms to the anatomy of the occupant in such a manner as to permit prolonged pedaling with a minimum of discomfort and fatigue.

Another object is to provide such a seat having a major rump supporting portion dimensioned to extend laterally in opposite directions beyond the rump of the occupant, and to extend rearwardly beyond the spine and posterior portions of the rump, and which terminates forwardly in a pair of complexly curved buttock front support lips extending laterally to the corresponding lateral forward edges of the aforesaid major rump supporting portion from opposite sides respectively of a central or sagittal portion of the seat arranged to underlie the perineum.

The major portion of the seat is slightly dished symmetrically with respect to the sagittal or mesial plane to conform to the contour of the seated rump and to support the perineum above or in light contact with the sagittal portion. The latter has a cantilevered extension forward of the perineum and defined by a generally horizontal top surface and a pair of vertical thigh orientating sides parallel to and spaced by the sagittal plane.

Each front support lip has a lateral extent between inner and outer ends that merge respectively with the sagittal portion adjacent the rearmost end of the associated adjacent thigh orientating side and the lateral forward edge of said major portion. Each lip also comprises a compound curve that curves forwardly and downwardly throughout its lateral extent, rearwardly from both its inner and outer ends, and also downwardly from both its inner and outer ends, such that the midregion of the rearward curvature measured along that curvature is rearward of both the inner and outer ends. Each front support lip also conforms throughout its lateral extent to the overlying physiological fold of the occupant between the posterior upper portion of the thigh and buttock.

By virtue of the structure described, an occupant of the seat may readily orientate himself thereon by sensing the engagement between his thighs and the forward extension of the sagittal portion when the thighs are extending forwardly and downwardly from the buttock forward support lips. In this latter regard, the parallel sides of the forward extension are an important concept, as compared to the typical forwardly converging or pointed forward end of a bicycle seat. They increase the pressure against the thigh with a minimum of mesial thigh movement when the occupant is not properly seated and also afford maximum leverage against the thigh when the latter is purposefully pressed against the adjacent side of the forward extension in an effort to return a dislodged occupant to a balanced position on the seat.

The major seat portion comfortably provides the primary support for the weight of the occupant and the complexly curved front support lips provide uninterrupted support for the forward portions of the buttocks along the physiological fold. In the seated position, the perineum is elevated above or at most lightly supported on the sagittal portion, and the thighs are positioned forwardly and downwardly whether at rest or in motion during pedaling, thereby to provide optimum comfort for the seated occupant with a minimum of seat top interference with the thighs during pedaling.

Other objects of this invention will appear in the following description and appended claims, reference being had to the accompanying drawings forming a part of this specification wherein like reference characters designate corresponding parts in the several views.

Figure 1:
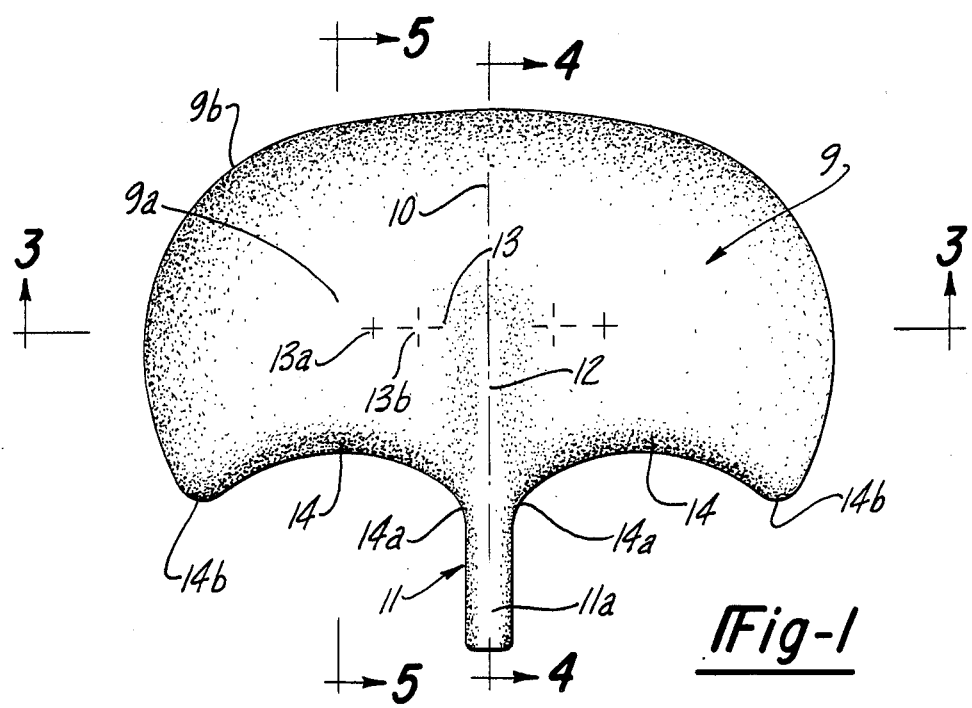
FIG. 1 is a plan view of a seat embodying the present invention.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

BRIEF DESCRIPTION OF A PREFERRED EMBODIMENT

Referring to the drawings, a seat adapted for use as a bicycle seat is illustrated comprising a major rump supporting portion 9 dished slightly at central portions 9a at opposite sides of the sagittal or mesial plane 10 and curving upwardly to an elevated locating rim 9b that extends along the sides and rear of the major portion 9.

Figure 2:
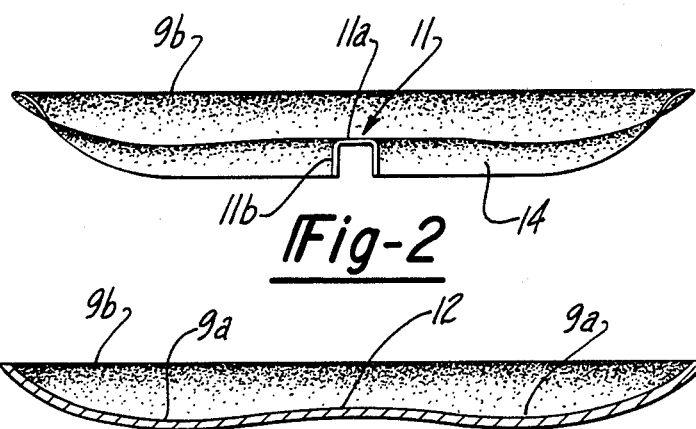
FIG. 2 is a front elevational view of the seat of FIG. 1.

Forwardly from the major portion 9 is a central sagittal extension 11 having a general horizontal upper surface 11a and lateral sides 11b spaced symmetrically by the sagittal plane 10, FIG. 2. The upper surface of the extension 11 merges rearwardly with a central perineum or sagittal portion 12 of the seat adapted to underlie the perineum of an occupant of the seat. The top surface of the perineum portion 12 extends generally in parallelism with the top surface 11a to approximately a transverse line 13 through the ischial regions of the seat, which may vary somewhat from person to person between the locations 13a and 13b on opposite sides of the sagittal plane 10.

Figure 3:
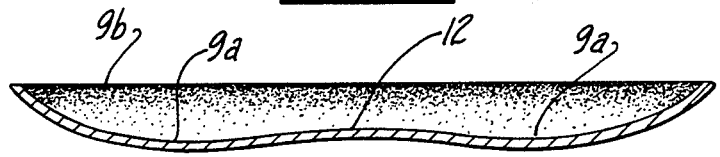
FIG. 3 is a transverse lateral section taken in the direction of the arrows substantially through the ischial region along the line 3—3 of FIG. 1.

From the line 13, the major seat portion 9 along the sagittal plane 10 gradually inclines rearwardly toward the locating rim 9b, then curves rapidly upwardly to comprise the rear portion of the rim 9b. On either side of the sagittal plane 10, the major seat portion 9 declines gradually along the line 13 to the bottom of the dished portion 9a adjacent to or slightly laterally of the ischial region 13a, b, then gradually inclines laterally toward the rim 9b, and at the rim 9b curves rapidly upwardly, FIG. 3.

Figure 4:
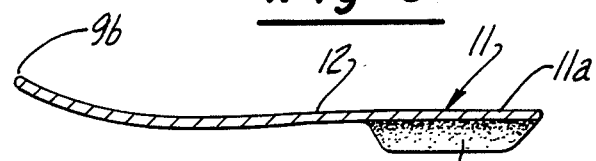
FIG. 4 is a sagittal section taken in the direction of the arrows along the line 4—4 of FIG. 1.
Figure 5:
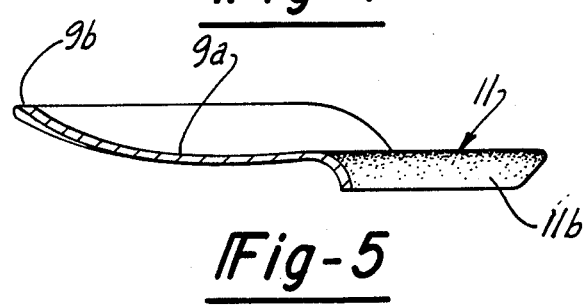
FIG. 5 is section taken parallel to the section 4—4, but in the direction of the arrows along the line 5—5 of FIG. 1.

The forward edge of the seat is defined by a pair of complexly curved buttock front support lips 14 that curve forwardly and sharply downwardly as indicated in FIGS. 4 and 5. Each lip 14 extends laterally from an inner end 14a, that merges with the rearward portion of the sagittal extionsion 11, and merges at its outer end 14b with the forward lateral edge of the seat portion 9. The curvature of each lip 14 throughout its lateral extent between its ends 14a and 14b is dimensioned to conform closely to the curvature of the overlying physiological fold between the buttock and posterior portion of the thigh of the occupant and is thus dimensioned so that its midpoint measured along its lateral curvature is rearward of both the inner end 14a and outer end 14b. Preferably the ends 14a and 14b are approximately at the same forward location, FIG. 1. Also the lip 14 curves upwardly from adjacent to its mid portion to both its inner and outer ends 14a, 14b. As illustrated in FIG. 5, the surface of the dished portion 9a extends generally in parallelism with the top surface of the sagittal extension 11 and merges via a slight decline with the lip 14.

By reason of the forward extension 11 and upturned rim 9b, an occupant of the seat may readily align himself comfortably with his rump centered generally between the lateral edges 9b and with his forwardly extending and declined thighs straddling the projection 11. His buttocks will then be positioned in the regions 13a to 13b and each physiological fold at the posterior region of the forwardly and declined thigh will be supported by the associated forwardly declined lip 14, curving rearwardly and downwardly from its ends 14a and 14b, along the major portion of its lateral extent from adjacent to the juncture 14a, i.e. its juncture with the perineum.

Although a seat of one size will readily accommodate occupants in a range of sizes, the seat itself will preferably be provided in various size categories, as for example small, medium or large. Also reference herein to the various inclined and declined seat surfaces is with respect to the surface 11a in the horizontal position illustrated. In use, the occupant may tilt the seat to any angle desired for his personal comfort.

The projection 11 will ordinarily not be more than a couple of inches wide for a large person and will preferably be less for a smaller person, so as to avoid chafing thighs without a wedging action. The parallel sidewalls 11b extend sufficiently beyond the overlying perineum of the occupant, say 3 to 5 inches, to enable a cyclist for example to maintain his operating position, whether pedaling, coasting, or maneuvering over rough terrain requiring rapid steering movements tending to jostle him from the seat.

The complexly curved forward lips 14 underlying the aforesaid physiological folds provide a cyclist with major support for the rump or buttocks with a minimum of interference by the seat to the posterior surfaces of the thighs whether at rest or during pedaling. Furthermore, the parallel sides 11b enable the occupant to sense immediately by pressure against his thighs whether or not he is properly seated and balanced and also provide leverage enabling him to reposition himself and regain his balance by pressing one thigh or the other against the adjacent parallel side 11b. The advantages of the parallel sides 11b are especially noticeable, as compared to the typical forwardly tapered or pointed bicycle seat, when the seat is used with a bicycle, although the advantage is obviously not limited to such use.

When a cyclist is pumping, his thighs in the cycling mode are essentially parallel and his knees are closely spaced, as compared to normal seating on a lounge chair for example. Without the extension 11, or when the latter is forwardly tapered, not only is sensing of the cyclist's relative position with respect to the extension impaired, but his attempts to force himself back into a preferred seating position by pressing one thigh or the other against the extension is also impaired because of loss of leverage resulting from the necessity to swing the thigh a greater distance mesially in order to engage the tapered extension. In the extreme instance, the cyclists knees will come together to prevent any effective realignment force between the thigh and extension. Hence the parallel sides 11b, in combination with the forward support lips 14 conforming to and underlying the physiological folds between the buttocks and posterior portions of the thighs when at the seated position, provide optimum buttock support and seating comfort while enabling continuous sensing by the cyclist of his position on the seat and his leveraged control of that position without interfering with movement of his thighs during pedaling.

The effectiveness of the extension 11 enabling the rider to maintain himself and vehicle in balance is emphasized in addition to its utility assisting the rider in sensing and controlling of his position on the seat and is especially noticeable when the rider is jostled upward from the seat or when he assumes an elevated or jockey riding stance. In such a position he can apply thigh leverage against the parallel sides 11b to counteract lateral imbalance. The control afforded by the parallel sides of the narrow extension 11 then becomes very perceptible. On the other hand, balance control using the extension 11 is usually almost imperceptible because the rider and vehicle are essentially in operating balance most of the time and many lightly applied balancing efforts are combined with other body motions employed for steering and for maintaining a comfortable seated position. Nevertheless continual re-balancing of the vehicle takes place as the rider tends naturally to tilt his body while applying thigh pressure to the appropriate side of extension 11.

We claim:

1. A seat adapted for use with a bicycle, said seat having a major rump supporting surface and a forward extension, said extension having sides parallel to and spaced by a front-to-rear midline of said major surface and projecting forwardly from the forward edge of said major surface, and means for providing support for the major forward portion of the buttocks along the physiological folds between the buttocks and the posterior portions of the thighs of the occupant and at the juncture of said folds with the lateral forward portions of the perineum of the occupant, said means comprising a pair of buttock front support lips defining the forward edges of said major surface at opposite sides respectively of said extension, each lip having a lateral extent between inner and outer ends merging respectively with said extension and the lateral edge of said major surface, each lip comprising a compound curve curving forwardly and downwardly throughout its lateral extent and also curving rearwardly from both its inner and outer ends, such that the midpoint of said lateral extent measured along its curvature is rearward of both said inner and outer ends, the peripheral portions of said major surface rearwardly of said outer ends of said lips curving upwardly.

2. A seat according to claim 1, means for accommodating the gluteal protuberance of the occupant comprising a dished portion of said major surface at each of the opposite sides of said midline.

3. A seat according to claim 2, the compound curve of each lip also curving upwardly toward its inner and outer ends from adjacent to said midpoint thereof.

4. A seat according to claim 3, the lowermost portion of said compound curve for each lip being spaced laterally of said midpoint of that lip.

5. A seat according to claim 2, the upper surface of said extension and also said midline of said major surface forwardly from a line normal to said midline through the bottom of the dished portion at either side of said midline being essentially horizontal and flush with each other.

6. A seat according to claim 1, said inner and outer ends of either lip being spaced forwardly by approximately equal distances from said midpoint of the same lip.

7. A seat according to claim 1, the compound curve of each lip also curving upwardly toward its inner and outer ends from a location spaced laterally of said midpoint of the same lip.

8. A seat according to claim 7, said inner and outer ends of either lip being spaced forwardly by approximately equal distances from said midpoint of the same lip.

9. A seat according to claim 8, means for accommodating the gluteal protuberance of the occupant comprising a dished portion of said major surface at each of the opposite sides of said midline, the upper surface of said extension and also said midline of said major surface forwardly from a line normal to said midline through the bottom of the dished portion at either side of said midline being essentially horizontal and flush with each other.

10. A seat according to claim 3, the distance along a first line parallel to said midline from said midpoint of either lip to a second line normal to said midline through the bottom of either dished portion is approximately twice the distance along a continuation of the said first line from said midpoint to a line connecting the inner and outer ends of the same lip.

11. A seat according to claim 10, said inner and outer ends of either lip being spaced forwardly of the midpoint of the same lip by approximately equal distances.

12. A seat according to claim 8, the width of said extension transversely of said midline being approximately one-fourth the distance of a line connecting the inner and outer ends of the lip at either side of said midline, and said extension projecting forwardly from the inner ends of said lips approximately twice as far as the distance along a line parallel to said midline from the midpoint of either lip to a line connecting the inner and outer ends of the same lip.

13. A seat according to claim 1, said extension projecting forwardly from the inner ends of said lips approximately twice as far as the distance along a line parallel to said midline from the midpoint of either lip to a line connecting the inner and outer ends of the same lip.

14. A seat according to claim 13, the compound curve of each lip also curving upwardly toward its inner and outer ends from a location spaced laterally of said midpoint of the same lip.

15. A seat according to claim 14, the width of said extension transversely of said midline being approximately one-fourth the distance of a line connecting the inner and outer ends of the lip at either side of said midline, and said extension projecting forwardly from the inner ends of said lips approximately twice as far as the distance along a line parallel to said midline from the midpoint of either lip to a line connecting the inner and outer ends of the same lip.

16. A seat according to claim 15, said inner and outer ends of either lip being spaced forwardly by approximately equal distances from said midpoint of the same lip.

17. A seat according to claim 16, means for accommodating the gluteal protuberance of the occupant comprising a dished portion of said major surface at each of the opposite sides of said midline, the distance along a first line parallel to said midline from said midpoint of either lip to a second line normal to said midline through the bottom of either dished portion is approximately twice the distance along a continuation of said first line from said midpoint to a line connecting the inner and outer ends of the same lip.

18. A seat according to claim 11, the upper surface of said extension and also said midline of said major surface forwardly from a line normal to said midline through the bottom of the dished portion at either side of said midline being essentially horizontal and flush with each other, the width of said extension transversely of said midline being approximately one-fourth the distance of a line connecting the inner and outer ends of the lip at either side of said midline, and said extension projecting forwardly from the inner ends of said lips approximately twice as far as the distance along a line parallel to said midline from the midpoint of either lip to a line connecting the inner and outer ends of the same lip.

19. A seat according to claim 18, the lowermost portion of said compound curve for each lip being spaced laterally of said midpoint of that lip.

* * * * *